Jan. 18, 1966  F. ZANDMAN  3,229,567
SPLIT IMAGE VIEWER FOR PHOTOELASTIC GAUGES
Filed Dec. 28, 1961
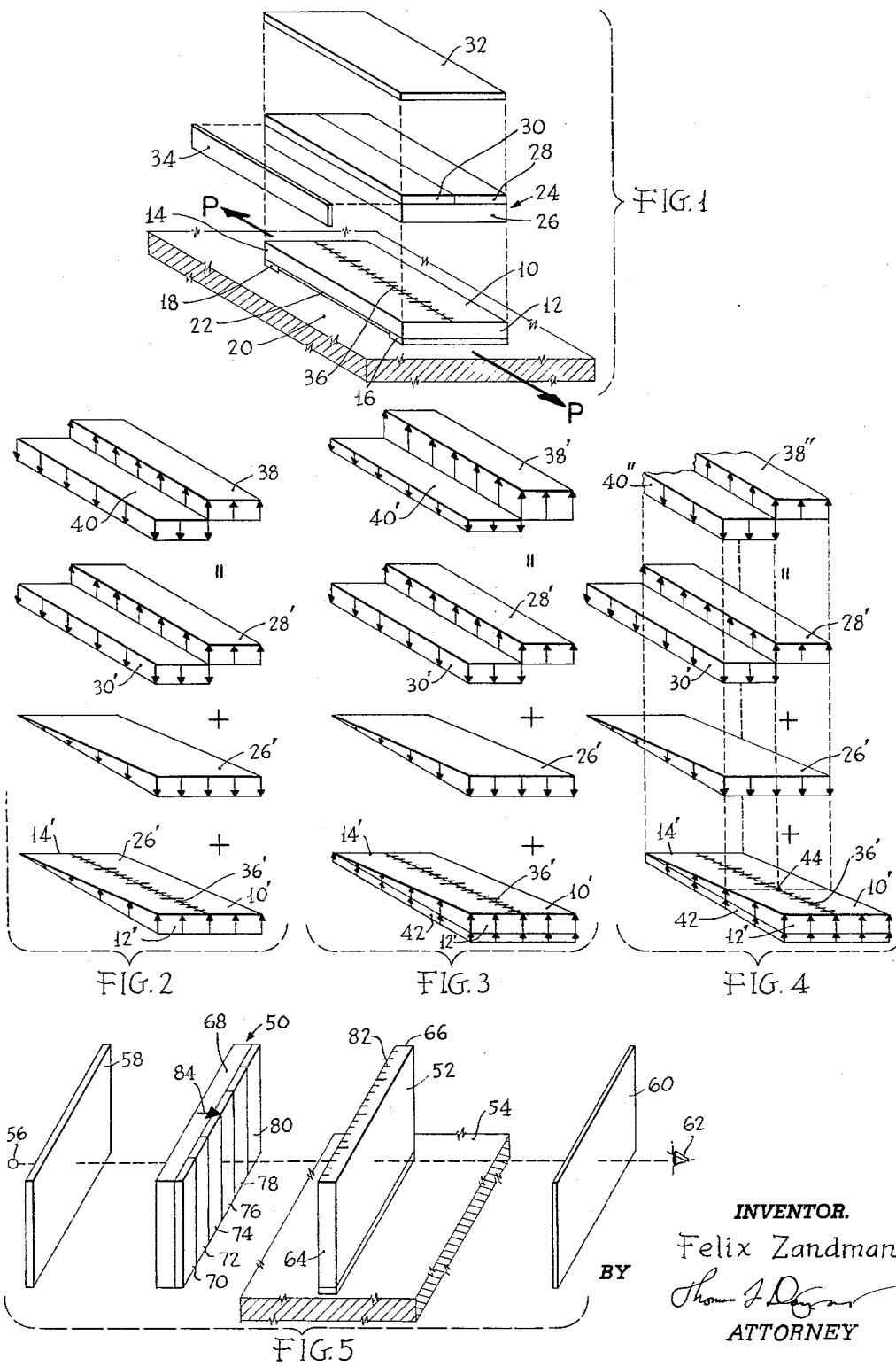
INVENTOR.
Felix Zandman
BY
ATTORNEY

United States Patent Office 3,229,567
Patented Jan. 18, 1966

3,229,567
SPLIT IMAGE VIEWER FOR PHOTOELASTIC GAUGES
Felix Zandman, Villanova, Pa., assignor to The Budd Company, Philadelphia, Pa., a corporation of Pennsylvania
Filed Dec. 28, 1961, Ser. No. 162,668
2 Claims. (Cl. 88—14)

This invention pertains to a viewing device for use with photoelastic gauges of the type exhibiting preformed regular patterns of bias-birefringence. More particularly, this invention pertains to such a device as adapted to yield split-field color comparison readout.

The interpretation of photoelastic gauge indications in the past has required color recognition by subjective standards which are difficult to reproduce under variable illuminating conditions by different observers. Significant improvements in read-out accuracy have been provided by photoelastic gauges incorporating testpieces exhibiting biasing patterns of birefringence. Such gauges are described and claimed in the copending application of Felix Zandman and Solomon Redner, Serial No. 799,789, now Patent No. 2,985,748 filed March 16, 1959 and assigned to the same assignee as is this application. The latter gauges may be observed by a viewing system comprising a reflector at one side of the testpiece and a sheet of polarizing material at the other side to visualize relatively well defined and uniformly spaced fringes which appear to move in a manner directly related to externally imposed loads. Even in the case of these improved arrangements, however, it is still required that the observer recognize a color, usually a so-called tint of passage or boundary fringe color, and then follow the motion of that specific color. Color values or positions are, of course, not discrete because of the continuous spectrum nature of ordinary illumination.

Therefore it is an object of this invention to provide an improved viewing device yielding a split-field color comparison for precise determination of the forced-birefringence produced in photoelastic gauges.

A further object is to produce a split-field color comparison viewer which is economical to produce, precise in its operation, and readily employable by technicians having little or no previous experience with photoelastic systems.

A more specific object of the invention is to provide a split-field color comparison viewer for use with photoelastic testpieces of the type exhibiting a bias-birefringence gradient, the viewer being adapted to slide parallel with that gradient between a position where the split-fields are matched during a first loading condition to a second position where the split-fields are matched during a second loading condition, whereby the difference between the loading conditions is determined directly by measurement of distance between the first and second positions.

According to this invention the split-field color comparison viewer comprises a photoelastic compensator strip having a bias-birefringence gradient opposite to that of the associated testpiece gradient and two field-splitting strips each exhibiting equal but opposite uniform bias-birefringence arranged contiguous with the compensator strip so as to cover complementary areas of the compensator strip.

While the invention is particularly pointed out and distinctly claimed in the claims appended to this specification, a better understanding will be had together with additional objects and advantages upon consideration of the following description taken in conjunction with the accompanying drawing wherein:

FIG. 1 is an exploded view illustrating a preferred viewer embodiment according to this invention arranged for cooperation with the testpiece of a photoelastic strain gauge;

FIGS. 2, 3 and 4 are successive diagrammatic representations of optical properties useful in explaining the theory of operation of the FIG. 1 embodiment; and FIG. 5 illustrates a modification of the viewer of FIG. 1 in operative position with respect to the testpiece of a photoelastic stress gauge.

The photoelastic testpiece 10 in FIG. 1 is shown attached at its ends 12 and 14 by cement layers 16 and 18 to a generalized workpiece 20 to respond to workpiece strains along direction P, P. The testpiece 10 is assumed to exhibit a bias-birefringence gradient varying linearly from a maximum at end 12 to a minimum at end 14. A reflecting means 22 is provided between testpiece 10 and workpiece 16 by a metallic coating, for example. As is known and explained more fully in the above-mentioned copending application, this adaptation of testpiece 10 constitutes a photoelastic strain gauge and imposition of a workpiece strainer results in the addition of uniform forced-birefringence to the testpiece bias-birefringence. In the past the forced-birefringence and the concomitant workpiece strain have been determined by noting color fringe changes or position shifts between unloaded and loaded testpiece conditions.

The split-field color comparison viewer 24 of this invention comprises a photoelastic compensator strip 26 and a pair of field splitting plates 28 and 30 exhibiting equal but opposite uniform bias-birefringence and each covering one-half of the compensator width. A polarizer-analyzer strip 32 of polarizing sheet material may be superimposed over viewer 24 to polarize incident ordinary illumination and analyze back-reflected transmitted light.

The viewer elements and strip 32 may be cemented or laminated together by adhesive means, not specifically shown, and structurally aligned with testpiece 10 by means of a flange 34 arranged to guide motion of the viewer in translation longitudinally of the testpiece. A scale 36 may be provided for the measurement of translatory displacements. When viewer 24 is set upon and translated in contact with testpiece 10, scale 36 may be read at the intersection with and end of compensator 26.

The theory involved in an understanding of the photoelastic phenomena as applied according to this invention is diagrammed in FIGS. 2, 3 and 4. Horizontal and oblique coordinates are employed to indicate width and length respectively of the active elements of the FIG. 1 system which are labeled by corresponding primed numerals. The vertical coordinate, instead of indicating thickness is here utilized for vectoral representation of birefringence. Vectors, arrows, pointing upward may be taken as indicating positive birefringence, vectors pointing downward show negative birefringence, and the vector lengths indicate magnitudes of birefringence exhibited in polarized light transmitted along the vector directions.

It should be realized that forced-birefringence is directly proportional to the difference between principal strains or principal stresses imposed upon photoelastic materials. Positive birefringence values may be assigned arbitrarily the case where principal strain $e_p$ or principal stress $p$ is greater than the other principal strain $e_q$ or principal stress $q$. Bias-birefringence is inherent birefringence porduced, for example, by residual internal stress patterns, and is independent of external loading conditions.

According to the above convention, wedge 10' represents the optical properties of a testpiece 10 wherein a regular birefringence gradient has been preformed by "freezing in" a principal stress difference gradient as explained in the above copending application. The testpiece gradient varies linearly from a positive maximum at end 12' to a minimum at end 14' along a given slope. Similarly, the compensator represented here by wedge 26' is provided with a preformed bias-birefringence gradient which is the mirror image of the testpiece gradient, varying from a negative maximum to a minimum.

Birefringence in light transmitted through photoelastic strata in series is summed algebraically so that with the areas of the testpiece 10 and compensator 26 superimposed as shown by the position of wedges 10' and 26' in FIG. 2, their net birefringence is zero.

At 28' and 30' the optical effects of the image splitting elements 28 and 30 of FIG. 1 are diagrammed by the same convention. Each image splitting element has uniform bias birefringence of a given magnitude but the signs are opposite as shown by the oppositely directed vectors. The uppermost vectoral representation in each of FIGS. 2, 3 and 4 illustrates net birefringence of the superimposed portions of viewer 24 and testpiece 10. In FIG. 2, the net birefringence patterns 38 and 40 are identical to the bias-birefringence effects 28' and 30' of split image plates 28 and 30 since no forced-birefringence is assumed to have been imposed upon testpiece 10.

FIG. 3 illustrated the initial effect of a loading imposed upon strain gauge testpiece 10. It is assumed that an overall uniform positive birefringence has been added to testpiece bias-birefringence 12' as shown by vector envelope 42 as would be the case, for example, when a finite strain was imposed upon testpiece 10 along direction P, P. The bias-birefringence wedge 26' of compensator element 26 remains unchanged as do the bias-birefringence patterns 28' and 30' of split image plates 28 and 30. Therefore, the net optical effect comprises a first section 38', subtended by split image plate 28, wherein net birefrigence has been decreased and a second section 40', subtended by split image plate 30, wherein the net birefringence has been increased.

Birefringence in polarized light is concomitant with a relative retardation between the mutually perpendicularly plane polarized components into which the transmitted light has been resolved by the photoelastic material. Upon analysis of the transmitted light, coplanar projection of the relatively retarded components causes destructive interference subtraction of those wave lengths, colors, for which the relative retardation represents a 180° phase difference. This interference subtraction of certain colors from the transmitted light leaves visible colors which are a complementary function of the subtracted colors. As net birefringence varies from zero to some positive value, the visible colors vary through a spectral sequence (i.e. blue, green, green-yellow, yellow, orange, brown red, etc.) in one order. The visible colors vary through the same sequence in reverse order when net birefringence varies from zero to a negative value. While signs and directions are again arbitrarily assigned, the pertinent phenomenon is nevertheless definitely established in that the interference fringe colors vary through the spectrum in one order as net birefringence varies in one direction and in the opposite order as net birefringence varies in the other direction.

It will be realized, therefore, that during the production of the forced-birefringence indicated at 42, the colors visible within the area subtended by plate 28 will be varying in a different order from the colors visible in the area subtended by plate 30. A very sensitive indication of even the slightest forced-birefringence results. This is in contradistinction to the appearance of either a testpiece 10 and a compensator 26. In the absence of this image splitting reversal, individual fringe colors would vary uniformly in one direction only, through the spectral order. Color difference is doubled by the image splitting and the juxtaposition of oppositely varying colors greatly enhances discernment of color variation. These effects are depicted by the net birefringence envelopes 38' and 40', the vectoral sums of envelopes 42 and 28' and of envelopes 42 and 30', respectively.

FIG. 4 illustrates the effect of a compensating translation of viewer 24 relative to the testpiece 10. A position will be found at which the compensator birefringence gradient of wedge 26' equals the summation gradient of bias and forced-birefringence of the loaded testpiece indicated by vector envelopes 10' and 42. At this position, the net birefringence within the overlapping areas of the viewer and testpiece will again be equal to that of the image splitting elements, and of the same magnitude in both halves 38'' and 40'' as readily detectible by notation of the same color in both halves of the field of view. The compensating translation may be read upon scale 36 (36' in FIGS. 2 to 4) by counting the number of scale units between end 12 (12' in FIGS. 2 to 4), for example, and its intersection by compensator 26 (26' in FIGS. 3 to 4) as at 44. Since the wedges 12' and 26' have uniform slopes, compensating birefringence is linearly related to their relative translation as in the Babinet-Soleil compensator. Therefore, the scaler displacement is linearly related to forced-birefringence of envelope 42 and, in turn, to the magnitude of the workpiece strain along direction P, P.

While the necessary condition is that the uniform bias-birefringence of one split imaging element be equal and opposite to that of the other, it may be preferred that the magnitude of each such birefringence be chosen to produce a relative retardation of one wave length. The image splitting plates 28 and 30 of the FIG. 1 viewer would then be half-wave plates because viewing is by reflection and light passes twice through each plate thereby traversing the equivalent of a full-wave plate. With this latter arrangement, the net birefringence of the unloaded case, or of the loaded case upon adjustment of the viewer position to equate colors, causes the color visualized to be the so-called tint of passage or boundary fringe (color which occurs between the end of one spectral order and the beginning of the next). Near the tint of passage rapid color changes occur with slight changes in net birefringence.

The specific arrangement of the field splitting elements is not at all to be restricted to the longitudinal division shown, but could as easily be a lateral division or a division wherein a disc of positive birefringence is oriented within an aperture in a rectangular element of negative birefringence. While it is preferable that the two field splitting elements be complementary, that is, fill the entire area subtended by the viewer, this is not a necessary restriction. More than two field splitting elements including at least one pair having the same magnitude birefringence of opposing signs may be employed for various specific applications.

FIG. 5 illustrates application of a modified viewer 50 of this invention to the stress gauging adaptation of a photoelastic testpiece. The testpiece stratum 52 is here bonded throughout the area of one edge to workpiece 54 and is to be viewed by means of polarized light directed parallel with the workpiece surface light source 56, through polarizer 58, viewer 50, testpiece 52, and analyzer 60 to an observation position at 62. In this modification the polarizer and analyzer functions are performed by separate elements to illustrate an alternative to the integral polarizer-analyzer arrangement of the FIG. 1 viewer. As before, however, the testpiece is assumed to have a preformed bias-birefringence gradient or "wedge" sloping uniformly between end 64 and end 66. Compensator 68 is provided with this same wedge-like pattern of bias-birefringence but its sign is opposite to that of the testpiece birefringence. Image splitting elements here comprise an array of vertical strips 70 to 80 of uniform bias-birefringence, alternate ones (70, 74 and 78) exhibiting positive birefringence and the others (72, 76 and 80) exhibiting negative birefringence. Since observation is assumed to be by the direct transmission of polarized light, it is preferable that the image splitting elements each be full-wave equivalent plates.

Observation, as with the strain gauge adaptation, is by sliding the viewer along the testpiece between a first position of color coincidence at a first loading condition to a second position of color coincidence at a second loading condition. It is convenient that a scale 82 be provided, for example, along the upper surface of the testpiece for reading at the intersection of an index 84 on the viewer assembly. The scale may be graduated in convenient units or, upon the calculation of proper scaling factors, may be calibrated to read directly in terms of stress magnitudes for a testpiece of given thickness and stress optical sensitivity. Further details of preferred photoelastic stress gauges, per se, are disclosed in the copending application of Felix Zandman, Serial No. 847,529, now Patent No. 3,077,813 filed October 20, 1959 and assigned to the same assignee as is this application.

In the foregoing disclosure it has been shown that this invention provides an improved split image viewer for the photoelastic gauges and improved photoelastic gauging systems incorporating such a viewer in conjunction with a photoelastic testpiece. It should be understood, however, that the invention is not limited to the precise arrangement herein described, but that other arrangements within the scope of the appended claims are to be considered within the purview of this invention.

What is claimed is:

1. A split field color comparison photoelastic strain gauge system for determination of strain magnitudes at the surface of a workpiece, said system comprising an elongated photoelastic testpiece bonded at its ends to the workpiece and exhibiting a longitudinal, linear, bias-birefringence gradient of a given slope, reflecting means interposed between said testpiece and the workpiece and a viewer slidably mounted over said testpiece for longitudinal translation therealong, longitudinal scale indicia formed on said testpiece and a cooperating index formed on said viewer for read-out of relative translation of said viewer and said testpiece, said viewer being a laminate including a polarizer-analyzer stratum of polarizing sheet material, a compensator stratum exhibiting a linear bias-birefringence gradient of the same slope but of opposite sign relative to the testpiece gradient, and at least two field-splitting plates exhibiting uniform magnitude bias-birefringence, the bias-birefringence of one of said plates being opposite in sign to that of the other of said plates, said plates being arranged contiguous with and covering complementary areas of said compensator stratum, said field-splitting plates and said compensator stratum being operationally oriented between said polarizer-analyzer stratum and said testpiece.

2. The viewer of claim 1 wherein said field-splitting plates are half-wave equivalent plates.

References Cited by the Examiner

FOREIGN PATENTS 71,278   4/1959   France.
                 (1st add. to 1,148,457.)
1,249,069 11/1960 France.

OTHER REFERENCES

Jerrard: A Quarter-Wave Compensator with Sensitive Half-Shadow Device, Journal of the Optical Society of America, April, 1954, volume 44, No. 4, pages 292–294, QC–350–06.

Richartz et al.: Analysis of Elliptical Polarization, Journal of the Optical Society of America, volume 39, No. 2, Februray 1949, page 146, QC–350–06.

JEWELL H. PEDERSEN, *Primary Examiner.*

T. L. HUDSON, *Assistant Examiner.*